United States Patent [19]

Wykes et al.

[11] 4,166,526

[45] Sep. 4, 1979

[54] APPARATUS FOR LATERALLY ARRANGING BARS

[75] Inventors: Robert D. Wykes; Colin Roy, both of Worcester, Mass.

[73] Assignee: Morgan Construction Company, Worcester, Mass.

[21] Appl. No.: 853,447

[22] Filed: Nov. 21, 1977

[51] Int. Cl.[2] ............................................. B65G 47/26
[52] U.S. Cl. .................................... 198/458; 226/199
[58] Field of Search ............... 198/458, 445, 427, 442, 198/454, 439; 226/196, 199; 214/1 P; 271/64; 83/102.1, 105, 107

[56] References Cited

U.S. PATENT DOCUMENTS

| | | | |
|---|---|---|---|
| 3,071,236 | 1/1963 | Hahn et al. | 198/442 X |
| 3,401,785 | 9/1968 | Ferrari | 198/458 |
| 3,491,634 | 1/1970 | Tomshany | 198/458 X |

*Primary Examiner*—Robert B. Reeves
*Assistant Examiner*—Douglas D. Watts
*Attorney, Agent, or Firm*—Thompson, Birch, Gauthier & Samuels

[57] ABSTRACT

An apparatus for laterally arranging bars, particularly ferrous bars, moving longitudinally along a roller conveyor in a rolling mill. The bars are initially confined laterally into a compact group centrally located between the conveyor sides. The compact group is then subdivided into a plurality of laterally spaced bar packs which are then run over one or more magnetic separating rollers to achieve a desired lateral separation between each bar.

10 Claims, 6 Drawing Figures

APPARATUS FOR LATERALLY ARRANGING BARS

DESCRIPTION OF INVENTION

This invention relates generally to material handling equipment, and is concerned in particular with an apparatus for laterally arranging elongated elements moving longitudinally along a conveyor.

The invention is particularly suited for, although not strictly limited to operation in a rolling mill in advance of magnetic table rollers which are used to laterally separate ferrous bars in preparation for cutting by the profiled knives of a conventional shear. As herein employed, the term "bar" is intended to include any rolled elongated element, regardless of its cross-sectional shape or dimensions.

Experience has indicated that magnetic rollers cannot be relied upon to consistently and accurately separate ferrous bars unless some form of upstream bar arrangement or organization is performed. In the past, this has been attempted manually, but the results have been less than satisfactory.

Thus, the primary object of the present invention is the provision of an apparatus for laterally arranging and partially separating bars before they pass over magnetic rollers, thereby greatly ehancing the ability of the magnetic rollers to achieve the intended lateral separation of the bars.

Another object of the present invention is to eliminate, or at least substantially reduce, manual handling of bars being directed to a shear.

These and other objects and advantages of the present invention will become more apparent as the description proceeds with the aid of the accompanying drawings wherein.

Figure 1:
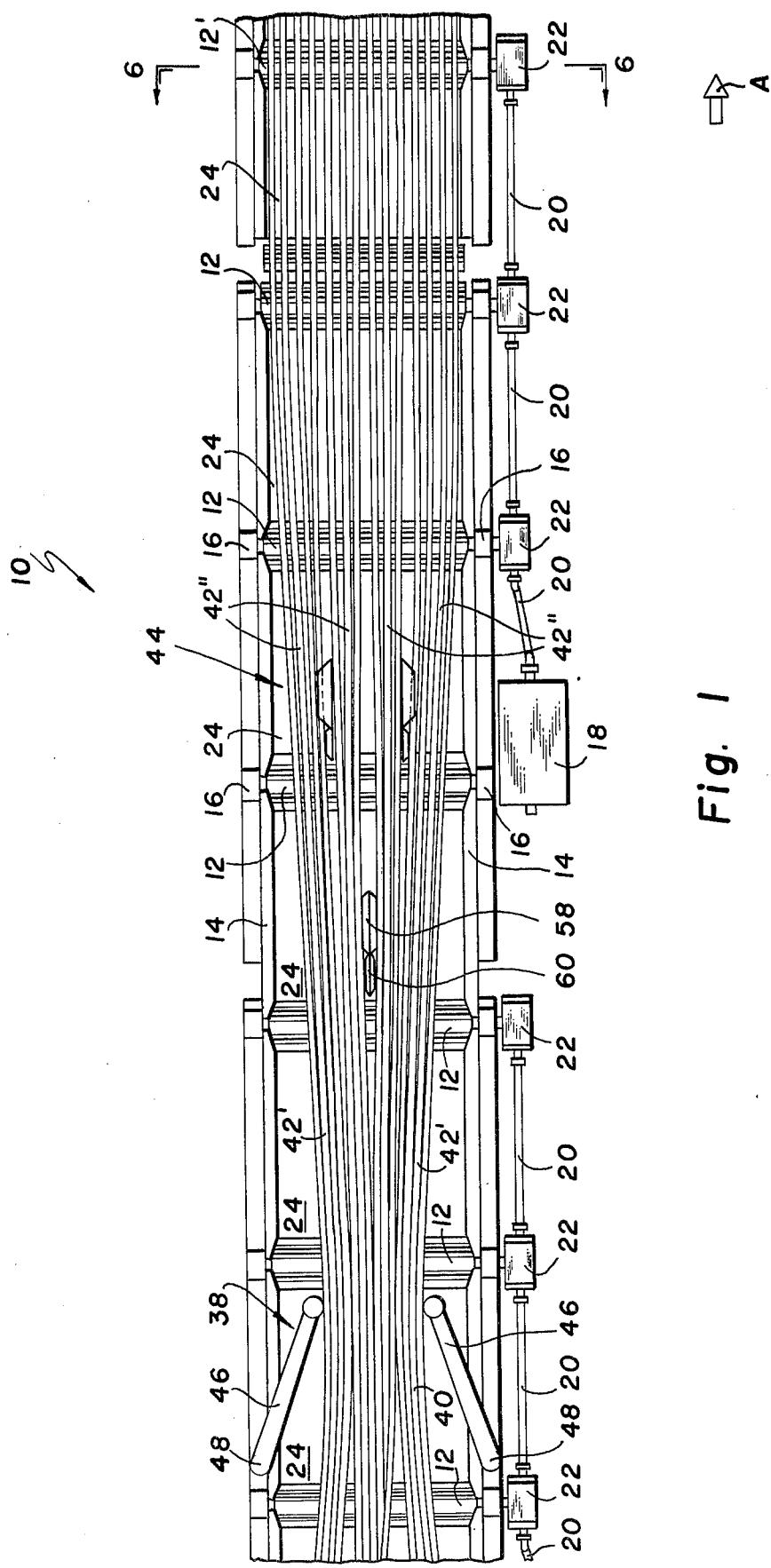
FIG. 1 is a plan view of an apparatus embodying the concepts of the present invention.
Figure 5:
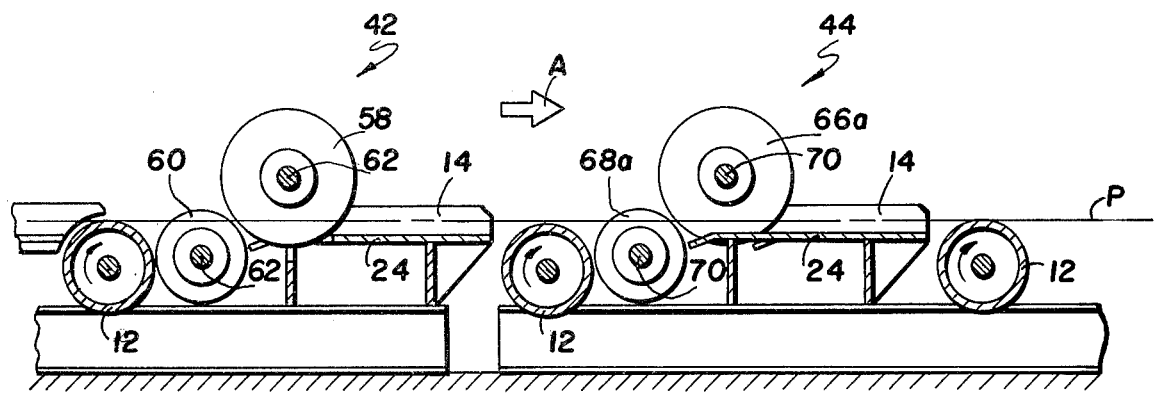
FIG. 5 is a sectional view taken along lines 5—5 of FIG. 4.

Referring initially to FIG. 1, there is shown at 10 a section of a conventional roller conveyor of the type employed in rolling mills to longitudinally convey bars from one location to another, for example from the delivery side of a cooling bed to a shear. The roller conveyor is comprised basically of a plurality of table rollers indicated typically at 12 which extend laterally across the conveyor path between upstanding conveyor sides 14. The rollers 12 are rotatably supported between bearing indicated typically at 16, and at least some if not all of the rollers are driven by motors 18 operating through appropriately coupled connecting shafts 20 and gear boxes 22. Apron plates 24 extend horizontally between the rollers 12. As is best shown in FIG. 5, the rollers 12 are horizontally arranged with their cylindrical support surfaces tangent to a horizontal plan P. With the rollers driven in a clockwise direction as indicated schematically in FIG. 5, bars will be transported longitudinally in the direction of the arrows "A".

Figure 6:
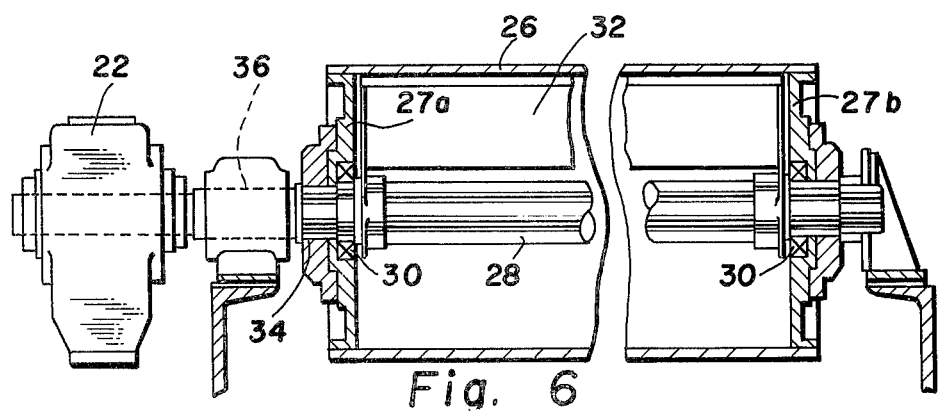
FIG. 6 is a sectional view on an enlarged scale taken along lines 6—6 of FIG. 1.

The roller 12' is a magnetic fanning roller which conventionally is employed to laterally separate ferrous bars before they arrive at a downstream shear (not shown). The fanning roller 12' can be of any known construction, an example of which is shown in greater detail in FIG. 6. Here it will be seen that the roller 12' has a cylindrical barrel 12 which has end plates 27a, 27b journalled for rotation on a fixed shaft 27 by means of bearing assemblies 30. The shaft 28 carries a non-rotating magnet 32 which extends over substantially the entire interior length of the roller barrel 26. The end plate 27a is connected as by welding at 34 to an end shaft 36 which is in turn driven by means of one of the previously referred to gear boxes 22.

As ferrous bars pass through the field of the magnet 32, magnetically induced separation forces act to laterally separate the bars. In theory, these forces should be adequate to achieve the intended lateral separation. However, in practice, it has been found that because of their extended lengths and frequent lateral misalignment, the bars will resist these separating forces and will not undergo proper lateral separation unless some preliminary arrangement and partial separation is donw at an upstream iocation.

As illustrated in FIG. 1, the present invention accomplishes this function through the cooperative operation of the following devices: a guide means generally indicated at 38 which operates to laterally confine the bars into a compact group 40 located approximately centrally between the sides 14 of the conveyor; a first divider means generally indicated at 42 downstream from the guide means 38 which operates to subdivide the bars in the group 42 into first bar packs 42' which are laterally spaced one from the other; and, second divider means generally indicated at 44 located downstream from the first divider means 42 for further subdividing the first bar packs 42' into laterally spaced second bar packs 42" which are again laterally spaced one from the other. As the second bar packs 42" proceed over the magnetic roller 12', the individual bars are finally laterally separated one from the other. If a single magnetic roller 12' is inadequate, additional downstream magnetic rollers (not shown) may be employed. Preferably, each magnetic roller is preceded by a lift roller 45 of the type described and claimed in our copending U.S. application Ser. No. 790,052 filed Apr. 22, 1977, now U.S. Pat. No. 4,098,393.

Figure 2:
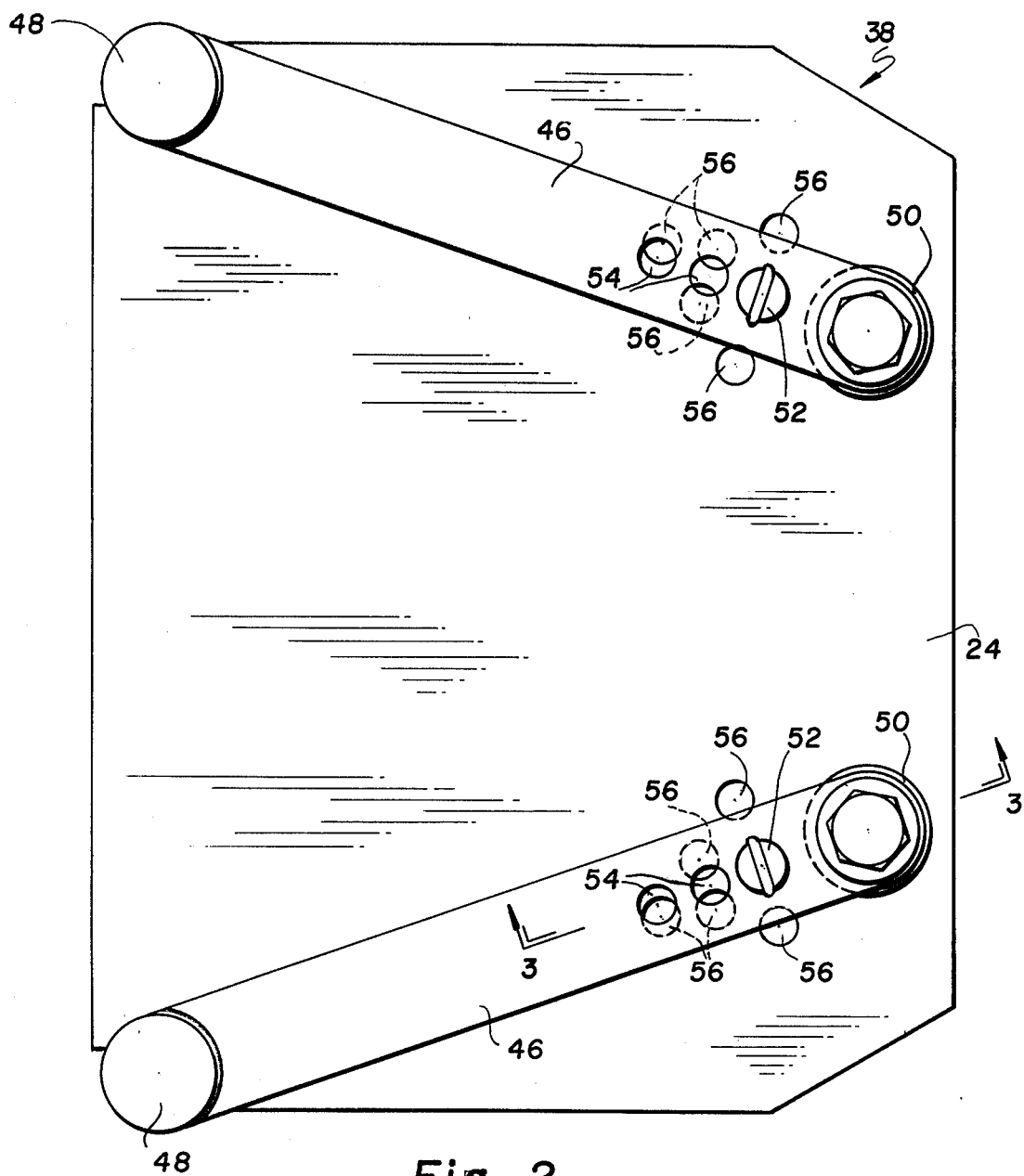
FIG. 2 is an enlarged plan view of the guide means for laterally confining the bars.
Figure 3:
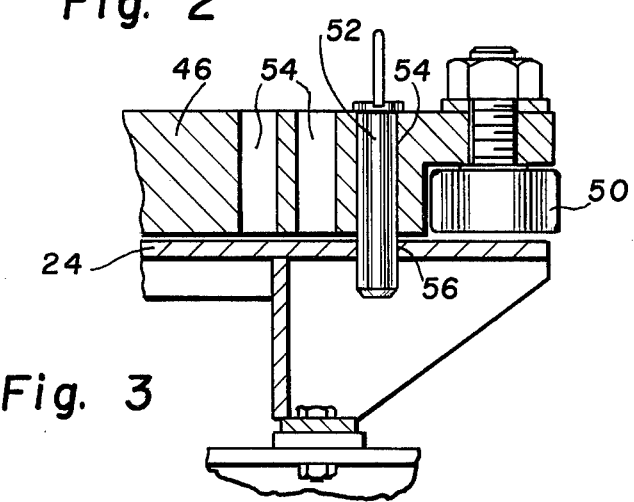
FIG. 3 is a sectional view taken along lines 3—3 of FIG. 2.

As is best shown in FIGS. 2 and 3, the guide means 38 includes a pair of elongated guide members or links 46 which are pivotally mounted as at 48 at locations adjacent to the conveyor sides 14. Each guide member 46 carries a bar engaging roller 50 at its distal end. The guide members 46 extend angularly inwardly from the conveyor sides 14 and are fixed in place by means of locating pins 52 which extend downwardly through one of several holes 54 in each of the guide members 46 into one of several holes 56 in the underlying apron plate 24. The angular arrangement of the guide members 56 can be adjusted by selecting an appropriate hole 54 in each guide member and an appropriate hole 56 in the apron plate. In this manner, the spacing between the guide members can be adjusted to centrally locate the bar group 40 between the conveyor sides 14. Different numbers and/or types of bars, regardless of cross-sectional dimensions and shapes, can thus be handled by the guide means 38.

Figure 4:
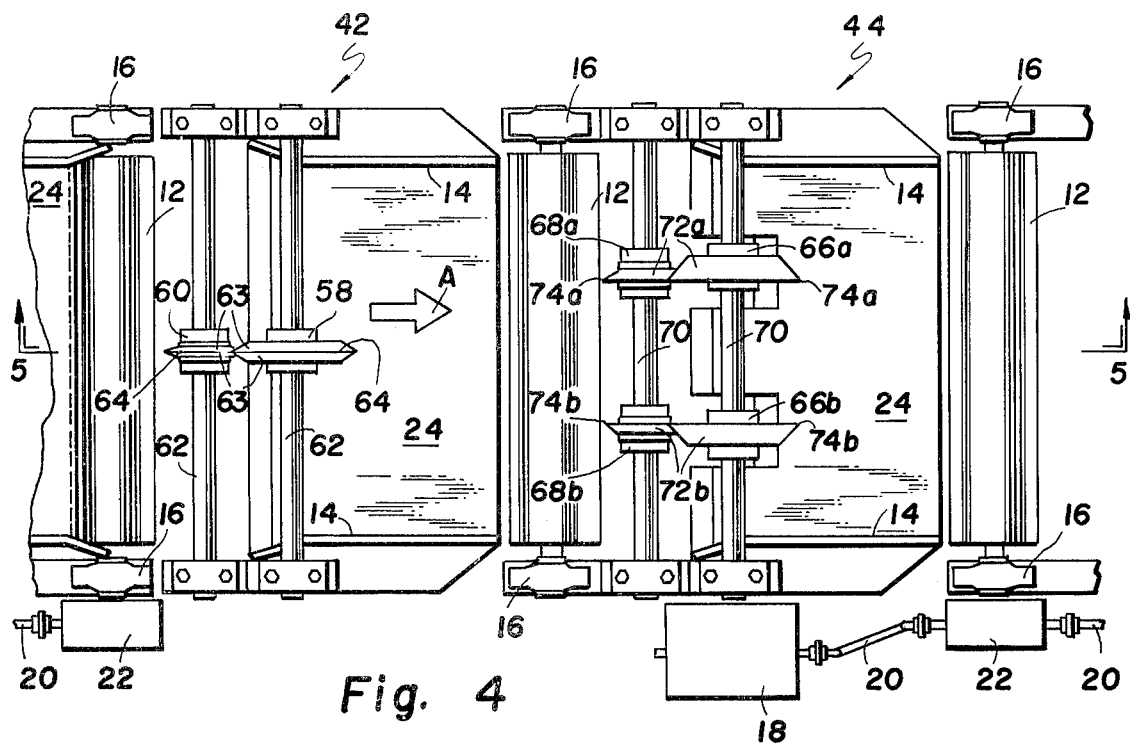
FIG. 4 is another plan view on an enlarged scale of the first and second divider means.

Referring now to FIGS. 4 and 5, it will be seen that the first divider means 42 is comprised of upper and lower freely rotatable separating discs 58, 60 carried on transverse shafts 62. The arrangement of the shafts 62 is such that the rotational axes of the upper and lower discs 58, 60 are arranged respectively above and below the plane P and offset in the direction of movement of bars along the conveyor. Each disc 58, 60 has two guide faces 63 arranged angularly with respect to the direction of bar movement and converging at a central knife-like edge 64. The angular faces 63 separate the compact bar group 40 into the two approximately identical "first" bar packs 42′.

The second divider means 44 consists of two laterally spaced cooperating pairs of upper and lower separating discs 66a, 68a and 66b, 68b carried on transverse shafts 70 which are again arranged so that the rotational axes of the upper discs of each pair are above the plane P and offset in the direction of bar movement relative to the rotational axes of the lower discs located below the plane P. The discs 66a, 68a have single guide faces 72a leading to inner knife-like edges 74a. The discs 66b, 68b are similarly provided with single guide faces 72b leading to inner knife-like edges 74b. The guide faces 72a, 72b are angularly inclined in opposite directions relative to the direction of bar movement along the conveyor. With this arrangement, the first bar packs 42′ are each further subdivided into laterally separated second bar packs 42″.

If it should happen that some of the bars approaching the guide means 38 are piled one on top of the other, then the lateral shifting experienced by the bars as they progress first through the guide means 38 and then through the first and second divider means 42, 44 will usually rearrange the bars into a single layer before the bars reach the fanning roller 12′. As the second bar packs 42″ approach the magnetic fanning roller 12′, the individual bars are affected by the magnet 32 and are thus individually laterally separated as shown. Under normal operating circumstances, this is achieved without manual intervention.

In light of the foregoing, it will now be apparent to those skilled in the art that the number of disc pairs for either the first divider means 42 or the second divider means 44 can be varied to suit particular operating conditions. Likewise, where the bars are not ferrous, a separating mechanism other than the magnetic fanning roller 12′ can be employed to achieve final lateral separation of the individual bars.

It is intended to cover these and any other changes or modifications of the embodiment herein chosen for purposes of disclosure which do not depart from the scope of the invention.

We claim:

1. Apparatus for laterally arranging bars moving longitudinally along a conveyor, said apparatus comprising: guide means for laterally confining the bars; first divider means downstream from said guide means for subdividing the bars into a plurality of first bar packs which are laterally spaced one from the other; and second divider means downstream from said first divider means for further subdividing said first bar packs into laterally spaced second bar packs, said first and second divider means each consisting of at least one pair of upper and lower discs, the upper disc of each pair being rotatable about an axis spaced vertically above said plane and the lower disc of each pair being rotatable about an axis spaced vertically beneath said plane, the upper and lower discs of each pair being arranged to laterally separate bars moving longitudinally into contact therewith.

2. The apparatus of claim 1 wherein said guide means is arranged to locate the laterally confined bars approximately centrally between the sides of the conveyor.

3. The apparatus of claim 1 wherein the arrangement of said guide means in relation to the transverse dimensions of the bars is such that the bars are confined into a compact group.

4. The apparatus of claim 1 wherein said guide means comprises guide members extending angularly inwardly from the sides of the conveyor.

5. The apparatus of claim 4 wherein said guide members are pivotally adjustable to accommodate bars with differing cross-sectional configurations and dimensions.

6. The apparatus of claim 5 wherein said guide members are provided at the distal ends thereof with bar engaging rollers.

7. The apparatus of claim 1 wherein said conveyor is comprised of a plurality of rotatable table rollers whose cylindrical support surfaces are tangent to a common horizontal plane, at least some of said table rollers being driven to thereby impart longitudinal movement to the bars.

8. The apparatus of claim 1 wherein the rotatable axes of the upper and lower discs of each pair are offset in the direction of movement of bars along the conveyor.

9. The apparatus of claim 1 wherein each of said discs has at least one guide face arranged angularly with respect to the direction of movement of bars along the conveyor means.

10. Apparatus for laterally arranging and partially separating bars moving longitudinally along a conveyor, said apparatus comprising: guide means for laterally confining the bars into a compact group substantially centrally located between the conveyor sides, said guide means comprising a pair of guide members extending angularly inwardly from the sides of said conveyor; first divider means downstream from said guide means for subdividing the compact group of bars into a plurality of first bar packs which are laterally spaced one from the other; second divider means downstream from said first divider means for further subdividing said first bar packs into smaller laterally spaced second bar packs, said first and second divider means comprising at least one pair of upper and lower rotatable discs arranged to laterally separate bars moving longitudinally into contact therewith.

* * * * *